United States Patent
Brand et al.

(10) Patent No.: US 9,513,623 B2
(45) Date of Patent: Dec. 6, 2016

(54) METHOD FOR GENERATING TRAJECTORY FOR NUMERICAL CONTROL PROCESS

(71) Applicant: Mitsubishi Electric Research Laboratories, Inc., Cambridge, MA (US)

(72) Inventors: Matthew Brand, Newton, MA (US); Amit K Agrawal, Santa Clara, CA (US); Huseyin Erdim, Swatle, WA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 369 days.

(21) Appl. No.: 14/160,053

(22) Filed: Jan. 21, 2014

(65) Prior Publication Data
US 2015/0205283 A1    Jul. 23, 2015

(51) Int. Cl.
G05B 19/41     (2006.01)
G05B 19/4103   (2006.01)
G05B 19/4093   (2006.01)

(52) U.S. Cl.
CPC ..... G05B 19/4103 (2013.01); G05B 19/40937 (2013.01); Y02P 90/265 (2015.11)

(58) Field of Classification Search
CPC ................. G05B 19/4103; G05B 2219/34141; G05B 19/40937; Y02P 90/265
See application file for complete search history.

(56) References Cited

U.S. PATENT DOCUMENTS

| 5,723,961 | A  |   | 3/1998  | Fujino |   |
|---|---|---|---|---|---|
| 5,815,401 | A  |   | 9/1998  | Otsuki et al. |   |
| 6,022,132 | A  | * | 2/2000  | Schulz | G05B 19/4184 318/569 |
| 6,243,611 | B1 | * | 6/2001  | Hazama | B25J 9/1666 700/104 |
| 6,675,061 | B2 | * | 1/2004  | Hirai | G05B 19/4103 318/568.15 |
| 7,444,202 | B2 |   | 10/2008 | Fauser |   |
| 7,620,473 | B2 | * | 11/2009 | Kamiya | G05B 19/4093 700/160 |
| 9,152,143 | B2 | * | 10/2015 | Iriguchi | G05B 19/40931 |
| 2005/0190185 | A1 | * | 9/2005  | Fauser | G05B 19/4103 345/441 |

(Continued)

OTHER PUBLICATIONS

Xu et al., Approximate the swept volume of revolutions along curved trajectories, Jun. 2007, 6 pages.*

*Primary Examiner* — Thuy Dao

(74) *Attorney, Agent, or Firm* — Gene Vinokur; James McAleenan; Hironori Tsukamoto

(57) ABSTRACT

A method for generating a trajectory based on an input trajectory formed by points representing spatial coordinates for a numerically controlled (NC) process determines a plurality of sequences of the points and determines, for each sequence, local costs of each point in the input trajectory. Each sequence is formed by removing a unique combination of points from the input trajectory and the local cost of a point for a sequence is determined based on a spatial arrangement of the point with respect to at least some of points in the sequence. For each sequence, a sum of corresponding local costs of each point in the input trajectory is determines and the trajectory is determined based on an optimal sequence with an optimal value of the sum of the local costs.

11 Claims, 12 Drawing Sheets

(56) References Cited

U.S. PATENT DOCUMENTS

| | | | | |
|---|---|---|---|---|
| 2010/0060642 A1* | 3/2010 | Chhaparwal | .......... | G06T 11/206 |
| | | | | 345/440 |
| 2014/0005804 A1* | 1/2014 | Brand | .................... | G05B 19/31 |
| | | | | 700/63 |
| 2015/0205284 A1* | 7/2015 | Fujino | .................... | G05B 19/19 |
| | | | | 700/187 |

* cited by examiner

METHOD FOR GENERATING TRAJECTORY FOR NUMERICAL CONTROL PROCESS

FIELD OF THE INVENTION

The invention relates generally to numerically controlled process and more particularly to determining a trajectory of a spatial coordinates for a numerically controlled process.

BACKGROUND OF THE INVENTION

Numerical control (NC) relates to the automation of machine tools that are operated by abstractly programmed commands encoded on a storage medium or mechanically automated via cams. Most of the current NC is computer numerical control (CNC), in which computers play an integral part of the control.

In modern CNC systems, end-to-end component design is highly automated using computer-aided design (CAD) and computer-aided manufacturing (CAM) programs. The programs produce a file that is interpreted to extract the commands needed to operate a particular machine via a postprocessor, and then loaded into the CNC machines for production. Typically, a numerically controlled machine is given a reference trajectory in the form of a sequence of points representing spatial coordinates of actuator positions or a mass to be moved. The CNC controls a movement of the mass to follow that trajectory, as well as possible, given physical constraints of the machine.

A motion controller operating a machining machine is one example of CNC. Lathes, grinders and coordinate measuring machines (CMMs) are other examples of manufacturing equipment which utilize a CNC for motion control. A three-axis CNC machining machine has a head where a tool is mounted and a table movable in the X. Y plane relative to the tool. Motors control motion of the table in the X and Y directions and motion of tool in the Z direction are according an orthogonal X, Y, Z Cartesian coordinate system. Positional sensors (typically encoders or scales) provide feedback indicating the position of the tool with respect to the coordinate system of the machining machine.

The CNC reads in a part program specifying a tool path trajectory that the tool is to follow at a specified velocity or feedrate. The tool motions are typically implemented using numerical control programming language, also known as preparatory code or G-Codes, see, e.g., the RS274D and DIN 66025/ISO 6983 standards. The controller continuously compares the current tool position with the specified tool path. Using this feedback, the controller generates signals to control motors in such a way that the tool's actual trajectory matches the input trajectory as closely as possible while the tool moves along the tool path at the desired velocity. The controller may be used in conjunction with a computer aided machining (CAM) system.

The trajectory and the corresponding G-Code are determined from a model of the desired outcome of the machining. After the trajectory is determined, the CNC does not have access to the original model and cannot compensate for any errors in the control. In addition, the trajectory information may not be an accurate representation of the desired machining, e.g., the trajectory may be corrupted by noise, excess quantization of the coordinates, under-sampling of the geometry of the model.

Therefore it is commonly necessary for the trajectory data to be reprocessed and resampled before being fed to the controller. Generally, this involves filtering and smoothing the sequence of the points. A number of conventional methods have been used to improve the input trajectory, including averaging, interpolating, fitting simple curves, and thresholds for rejection of outliers, see, e.g., U.S. Pat. Nos. 5,815,401, 7,444,202, and 5,723,961.

However, due to the limitation of the computational power of the CNC, the conventional methods process input trajectory locally, i.e., over small windows of data points. This leads to distinctly suboptimal results, because a small window may not include enough information to determine whether an outlying point represents a corner, a quantization artifact, a surplus motion, a sampling artifact, an under-sampled change in curvature, or some other artifact.

SUMMARY OF THE INVENTION

Various embodiments of the invention are based on a recognition that local modification of an input trajectory for a numeric control (NC) of a process based only on locally available information maybe suboptimal. This is because the local modification is determined without considering the structure and possible modification of other sections of the trajectory.

To address this deficiency, some embodiments of the invention, instead of locally modifying the input trajectory, use this local modification as one factor in a calculation of the totality of factors for considering global modification of the entire trajectory. To that end, some embodiments globally modify the trajectory based on a combination of a variety of possible local modifications.

For example, one embodiment processes an input trajectory formed by points representing spatial coordinates for NC to determine a plurality of sequences of the points. Each sequence is formed by removing a unique combination of points from the input trajectory and can represent a global modification of the entire input trajectory. For each sequence, the embodiment determines local costs of each point in the input trajectory. For example, a local cost of a point for a sequence is based on a spatial arrangement of the point with respect to at least some of points in the sequence.

In some embodiments, the local cost of a point for a sequence is determined even if the point is removed from this sequence. In such a manner, the embodiment can consider more possible local modification factors. The embodiment compares various sequences by determining, for each sequence, a sum of corresponding local costs of points of the input trajectory and selects an optimal sequence with an optimal value of the sum of the local costs. For example, the optimal value is a minimal or a maximum value of the sums of the local costs. By determining the sum of the local costs, the embodiment considers local cost of a point as one factor in a totality of factors allowing making a global decision on generating the trajectory based on the optimal sequence.

Accordingly, one embodiment discloses a method for generating a trajectory based on an input trajectory formed by points representing spatial coordinates for a numerically controlled (NC) process. The method includes determining a plurality of sequences of the points, wherein each sequence is formed by removing a unique combination of points from the input trajectory; determining, for each sequence, local costs of each point in the input trajectory, wherein the local cost of a point for a sequence is based on a spatial arrangement of the point with respect to at least some of points in the sequence; determining, for each sequence, a sum of corresponding local costs of each point in the input trajectory; and determining the trajectory based on an optimal sequence with an optimal value of the sum of the local costs, wherein the optimal value is a minimum or a maximum of the sums of the local costs. The steps of the method are performed by a processor.

Another embodiment discloses a system for generating a trajectory based on an input trajectory formed by points representing spatial coordinates for a numerically controlled (NC) process. The system includes a processor configured for determining a plurality of sequences of the points, wherein each sequence is formed by removing a unique combination of points from the input trajectory, wherein the removing includes labeling the unique combination of points as removed points and labeling preserved points in the sequence as one or combination of preserved, corner, noise, or redundant points; determining, for each sequence, local costs of each point in the input trajectory, wherein the local cost of a point for a sequence is based on a spatial arrangement of the point with respect to at least some of points in the sequence; determining, for each sequence, a sum of corresponding local costs of each point in the input trajectory; and determining the trajectory based on an optimal sequence with an optimal value of the sum of the local costs; and fitting splines into the preserved points of the sequence using the labeling.

DETAILED DESCRIPTION OF THE PREFERRED EMBODIMENT

System and Method Overview

Figure 1:
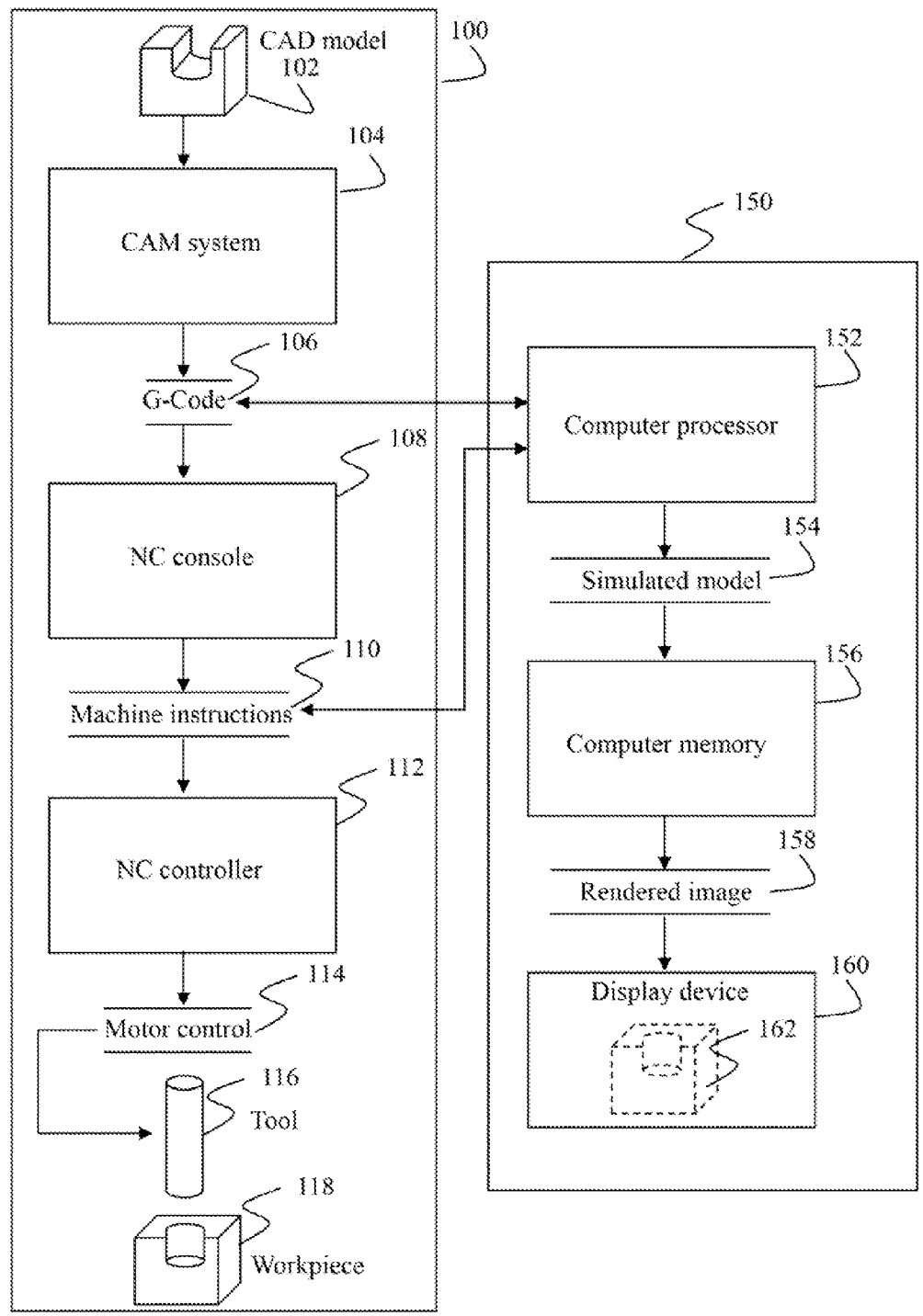
FIG. 1 is a flow diagram of an NC machine employing some embodiments of the invention.

FIG. 1 shows an example of a numerically controlled (NC) process, i.e., an NC machining system 100, and a system 150 for generating a trajectory based on an input trajectory formed by points representing spatial coordinates for the NC process. The input trajectory can be directly provided to the system 150 or specified by G-Codes 106. The system 150 determines and outputs the trajectory to the system 100. For example, the system 150 can modify the G-Codes 106 or machine instructions 110. In some embodiments, the NC machining system 100 is an NC milling system.

In the NC machining system 100, a computer aided design (CAD) model 102 is input to a computer aided manufacturing (CAM) system 104, which generates G-Codes 106 for controlling a NC machining machine. During NC machining, the G-Codes are input to a NC machining input interface 108, which processes each G-Code to produce a corresponding set of NC machine instructions 110. The NC machine instructions are input into an NC controller 112, which produces a set of motor control signals 114 to move a tool 116 relative to a workpiece 118 in order to machine the workpiece.

The system 150 can take as input either the G-Codes 106 generated by the computer aided manufacturing system 104, or the NC machine instructions 110 generated by the NC console 108. The input to the system 150 is read by a computer processor 152 generating the trajectory.

In some embodiments, the system 150 generates the trajectory in real time during the NC machining. In alternative embodiments, the system 150 simulates the machining of the workpiece to test the performance of the machining according to the trajectory. In those embodiments, the processor 152 generates a simulated model 154, which can be stored in a computer memory 156. The processor 152 can render the stored simulated model 154 to generate a rendered image 158 which can be output to a display device 160. A displayed image 162 can be compared to the computer aided design model 102 to verify the G-Codes 106 or NC machine instructions 110 prior to performing the actual NC machining of the workpiece.

Figure 2A:
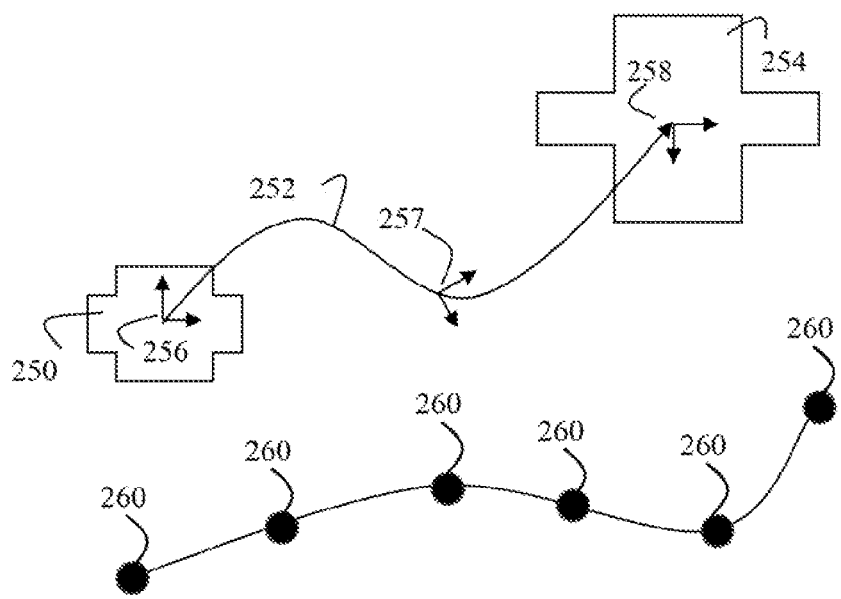
FIG. 2A is a schematic of a trajectory of the machining tool used by some embodiments of the invention.

FIG. 2A shows a trajectory 252 of a movement of a shape 250. The trajectory 252 specifies a position of a particular point of the shape 250 as a function of time. In some embodiments, the trajectory is formed by points 260 representing spatial coordinates for the NC machining. The trajectory of the tool is determined by the G-Codes and/or the NC machine instructions. Typically, the trajectory is determined by a set of segments, called herein NC segments, i.e., the segments of the NC tool path. For example, the trajectory of the tool can include positions of the tool at the beginning and at the end of each NC segment. The trajectory of the tool relative to the workpiece can be specified in many forms.

Figure 2B:
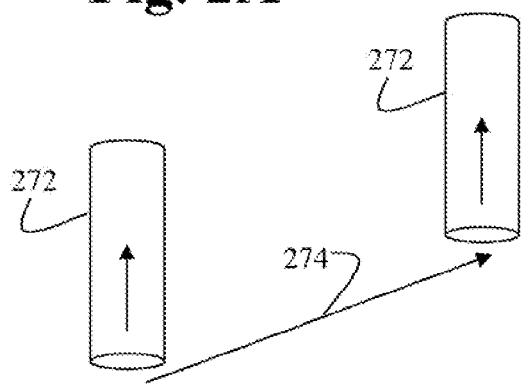
FIG. 2B is a schematic of a linear trajectory of a tool used by some embodiments of the invention.
Figure 2C:
FIG. 2C is a schematic of a curve trajectory of a tool used by some embodiments of the invention.

FIG. 2B shows a linear trajectory for a tool 272 moved along a straight line 274. FIG. 2C illustrates a curved trajectory, in which the tip 280 of the tool 272 is moved along a curve 276. Other possible trajectory forms include positioning the tool at a point, moving the tool along a sequence of lines known as a polyline, moving the tool along a spiral or helical curve, moving the tool along a polynomial curve, such as a quadratic Bezier curve or a cubic Bezier curve, or a sequence of polynomial curves known as a piecewise polynomial curve to name but a few examples.

Figure 3:
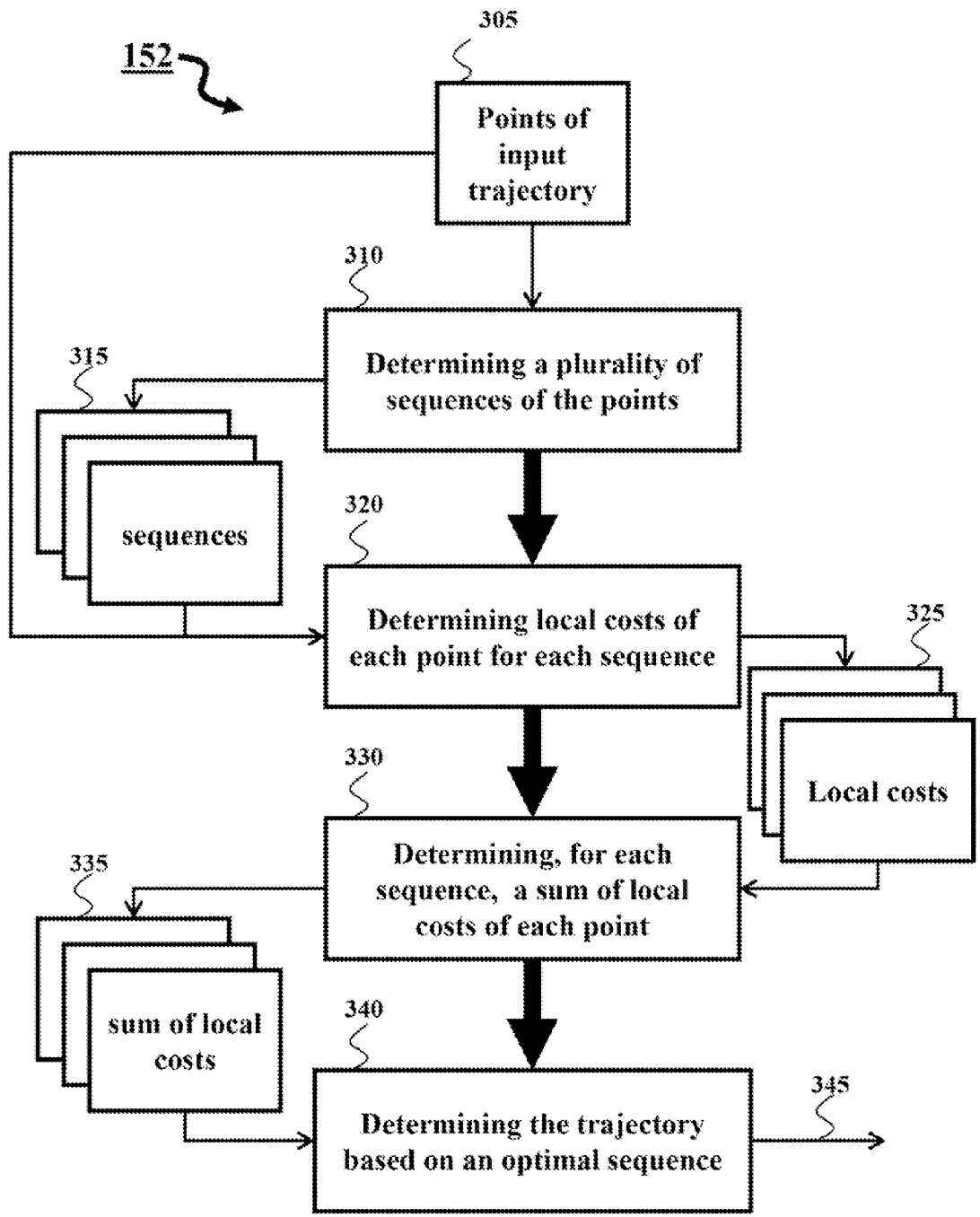
FIG. 3 is a block diagram of a method for determining a trajectory according to some embodiments of the invention.

FIG. 3 shows a block diagram of a method of generating a trajectory 345 based on an input trajectory formed by points 305 representing spatial coordinates for a numerically controlled (NC) process according to one embodiment of the invention.

The embodiment determines 310 a plurality of sequences of the points 315. Each sequence is formed by removing a unique combination of points from the input trajectory. In some embodiment the removing is performed by assigning different labels to input points. For example, sequences can be formed by assigning a removed label to a unique combination of points from the input trajectory, and by assigning the kept points to be a corner or smooth point labels.

Next, the embodiment determines 320, for each sequence, local costs 325 of each point of the input trajectory. For example, a local cost of a point for a sequence can be determined based on a spatial arrangement of the point with respect to at least some of points in the sequence. In some embodiments, the local cost is determined without considering the structure of the entire sequence, and thus the cost is local.

Next, the embodiment determines 330, for each sequence 315, a sum 335 of corresponding local costs of each point in the input trajectory, and determines 340 the trajectory 345 based on an optimal sequence with an optimal value of the sum of the local costs.

FIGS. 4A-D shows an example of determining the sequences of the points 315 by removing the combination points from an input sequence including a point 410, 420, 430 and 440. Presuming the starting point 410 and the ending point 440 are preserved in the sequence, the sequences can be formed by not removing points as in FIG. 4A, by removing a point 420 as in FIG. 4B, by removing a point 430 as in FIG. 4C and by removing both points 420 and 430 as in FIG. 4D.

The local cost of a point for a sequence can be determined even if the point is removed from that sequence. For example, the sum of the local costs for the sequence of FIG. 4B includes a local cost of the removed point 420 determined based on the distance from the point 420 to a chord 422, and a local cost of the preserved point 430 determined based on the angle 437.

Figure 4A:
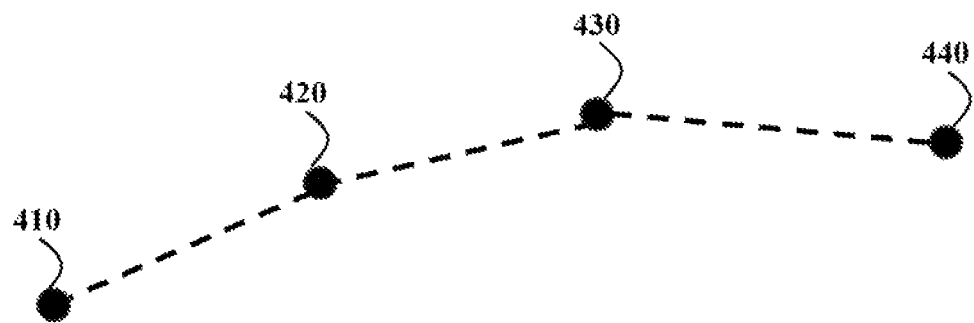
FIGS. 4A, 4B, 4C and 4D are examples of determining the sequences by removing different combination of the points from an input sequence according to some embodiments of the invention.
Figure 4B:
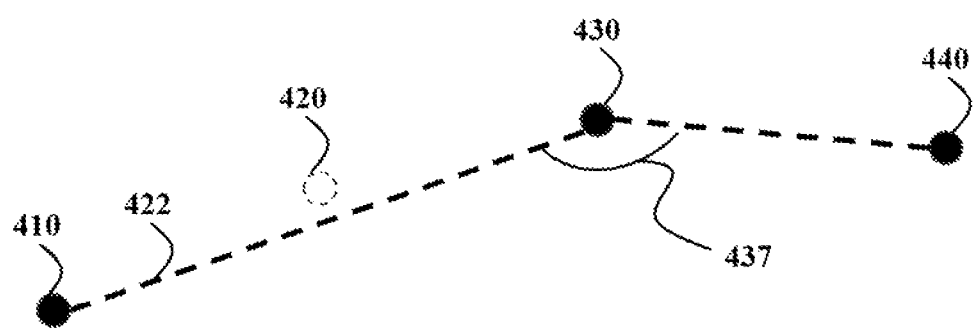
Figure 4C:
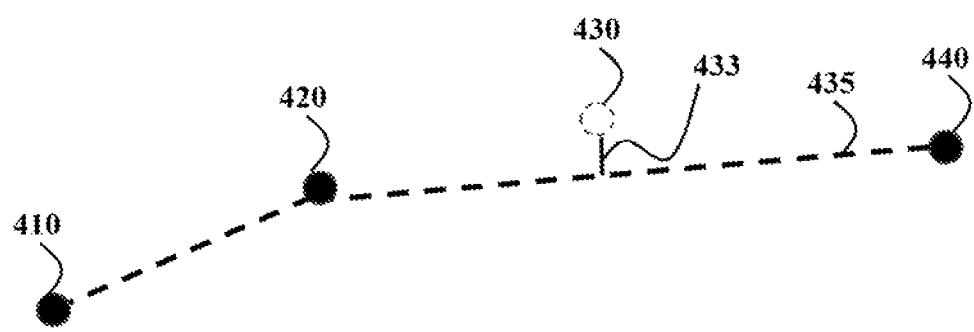
Figure 4D:
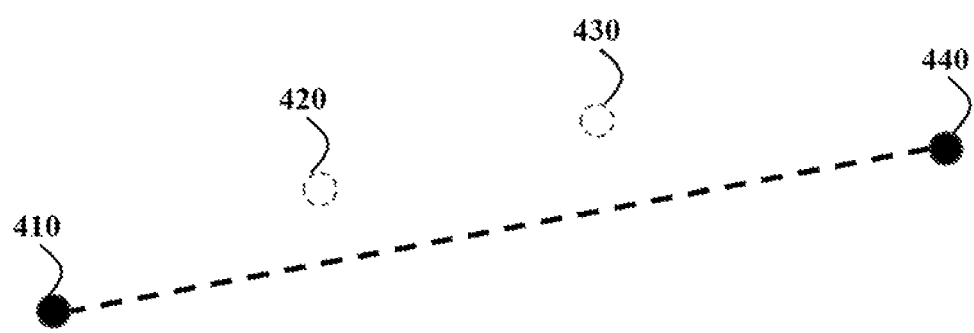

For example, in one embodiment, a local cost of a removed point, such as a point 430 in FIG. 4C, includes a distance cost proportional to a distance 433 from the removed point to a polyline of the sequence. In this example, the distance 433 is a distance from the point 430 to a chord 435 connecting two points 420 and 440 in the sequence surrounding the point 430.

A local cost of a preserved point, such as a point 430 in FIG. 4B, can include an angle cost proportional to an angle 437 form by the preserved point with the two points of the sequence surrounding the point. Accordingly, the same point can have different local cost determined for different sequences. In the example of FIGS. 4A-D, four local costs are determined for four different sequences of points. In one embodiment, the local costs for the starting and the ending points are not determined. In this embodiment, two local costs for four sequences of the example of FIGS. 4A-D are determined.

In the example of FIGS. 4A-D, the four sums of total costs are determined using local costs of the corresponding sequence. The optimal value can be a minimal or a maximal value of the sums of the local costs, depending on the definition of the cost and the objective of the NC. Usually, the objective is to minimize the total cost, the optimal trajectory is the one with minimal value of the sum of the local costs. If, for example, the sequence of FIG. 4B has a sum of the total costs less that each sum of the local costs of the sequences of FIGS. 4A, 4C, and 4D, then the sequence of FIG. 4B is selected as optimal and is used to modify input trajectory and/or to generate the trajectory. Notably, the input trajectory is modified globally, i.e., at once, by considering various possible modifications of the entire input trajectory.

Figure 5:
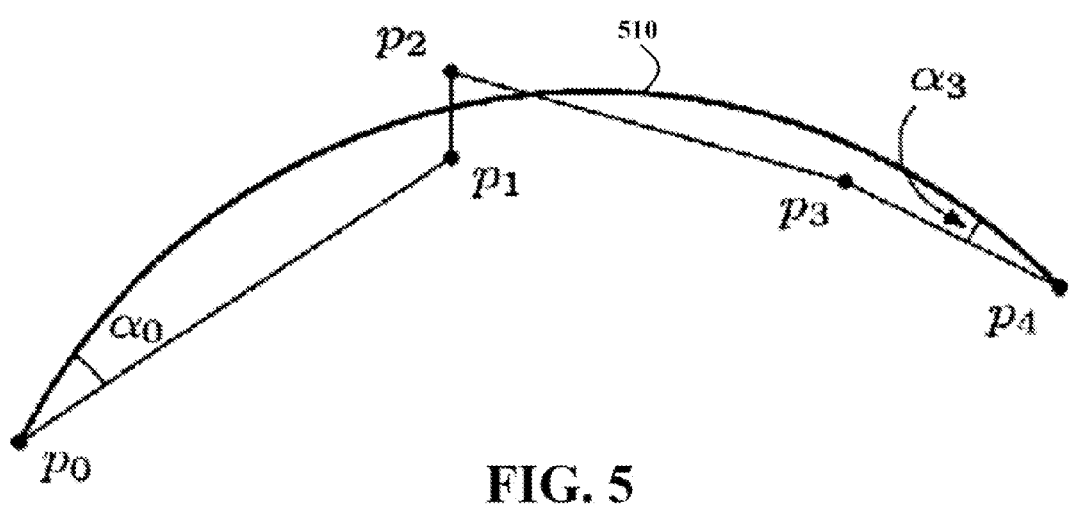
FIG. 5 is a schematic of one embodiment of the invention that further modifies the optimal sequence by fitting splines between some points according to some embodiments of the invention.

FIG. 5 illustrate one embodiment of the invention that further modifies the optimal sequence by fitting splines between the some points of the optimal sequence. In this example, the spline 510 is fitted between the points p0 and p4 by tracking the remaining points of the sequence p1, p2 and p3. The fitted spline form angles $\alpha 0$ and $\alpha 3$ with the original polyline of the sequence of points of FIG. 5. This embodiment is based on recognition that it is likely that the trajectory has straight sections, smoothly curved sections, and sections that contain abrupt changes in direction bracketed between relatively smooth motions, in accordance with the design of many manufactured objects.

Figure 6:
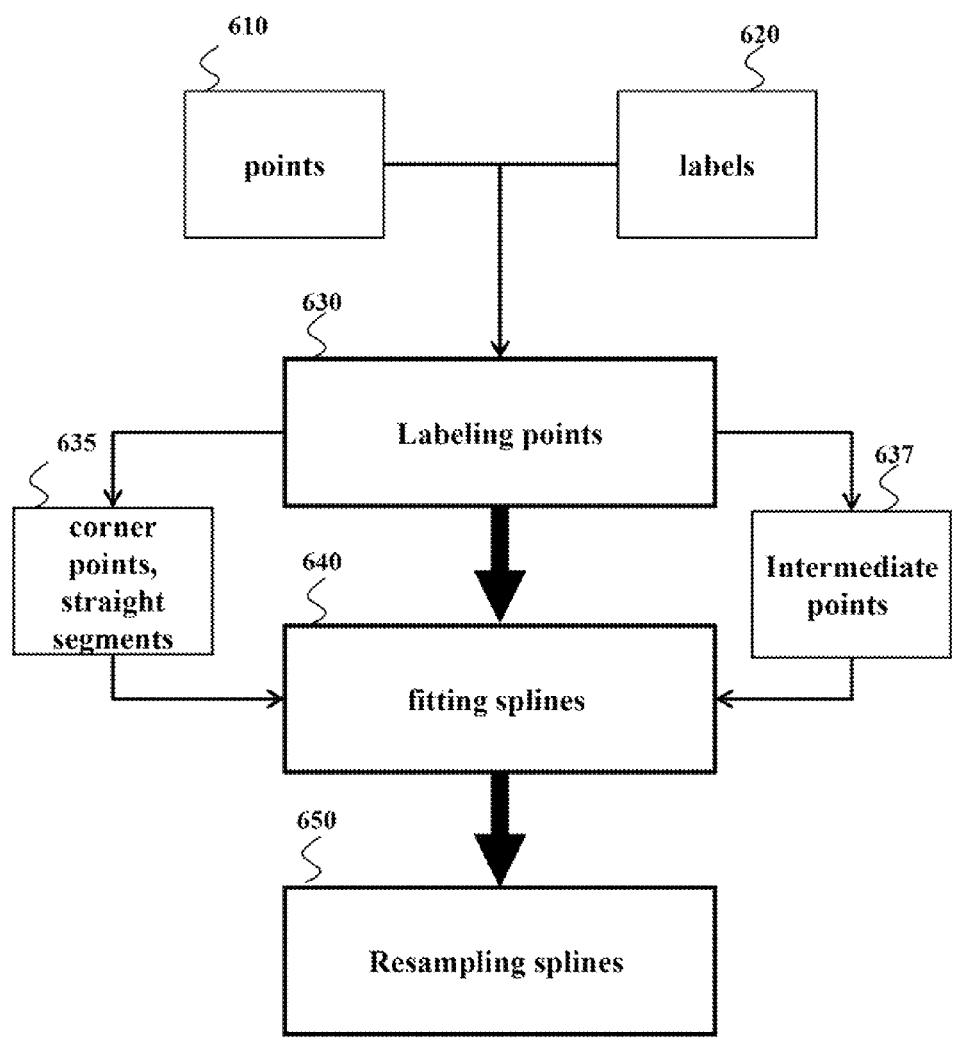
FIG. 6 is a block diagram of a method for fitting the splines according to one embodiment.

FIG. 6 shows a block diagram of a method for fitting the splines according to one embodiment. This embodiment labels 630 the points 610 of the optimal sequence according to predetermined types of the labels 620. The labeling can be used to determine the points preserved in the final trajectory or substituted with the fitted spline. The labeling 630 can be performed during the determination of the optimal sequence for all plurality of the sequence, or can be performed only for selected optimal sequence.

In one embodiment, the labeling identifies a plurality of corner points 635 and intermediate points 633 in the optimal sequence. The corner point can be determined based on the angle cost of the point. For example, in one embodiment, the point is a corner point if the angle formed by the point in the optimal sequence, e.g., the angle 437, is below a threshold. In another embodiment, the labeling of the corner for a given point is performed by computing both the angle cost and the corner cost for the given point. If assigning a corner label results in a smaller cost, then the corner label is assigned. In some embodiments, the corner points are preserved in the final trajectory, and the intermediate points are replaced by fitting 640 splines between the corner points tracking the intermediate points.

In some embodiments, labeling also identifies straight segments 635, which, as the corner points, are preserved in the trajectory. In those embodiments, the splines are fitted between the corner points and the points of the straight segments tracking the intermediate points. Next, the splines are resampled 650 to produce output points, such that the corner points, the points of the straight segments and the output points define the trajectory. In some embodiments, the resampling is determined by the needs of the controller. For example, the sampling intervals may be constant in arc-length, constant in acceleration, or any similar policy that generates points that produce smooth variations in feed rate while neither starving nor oversaturating the controller.

Figure 7:
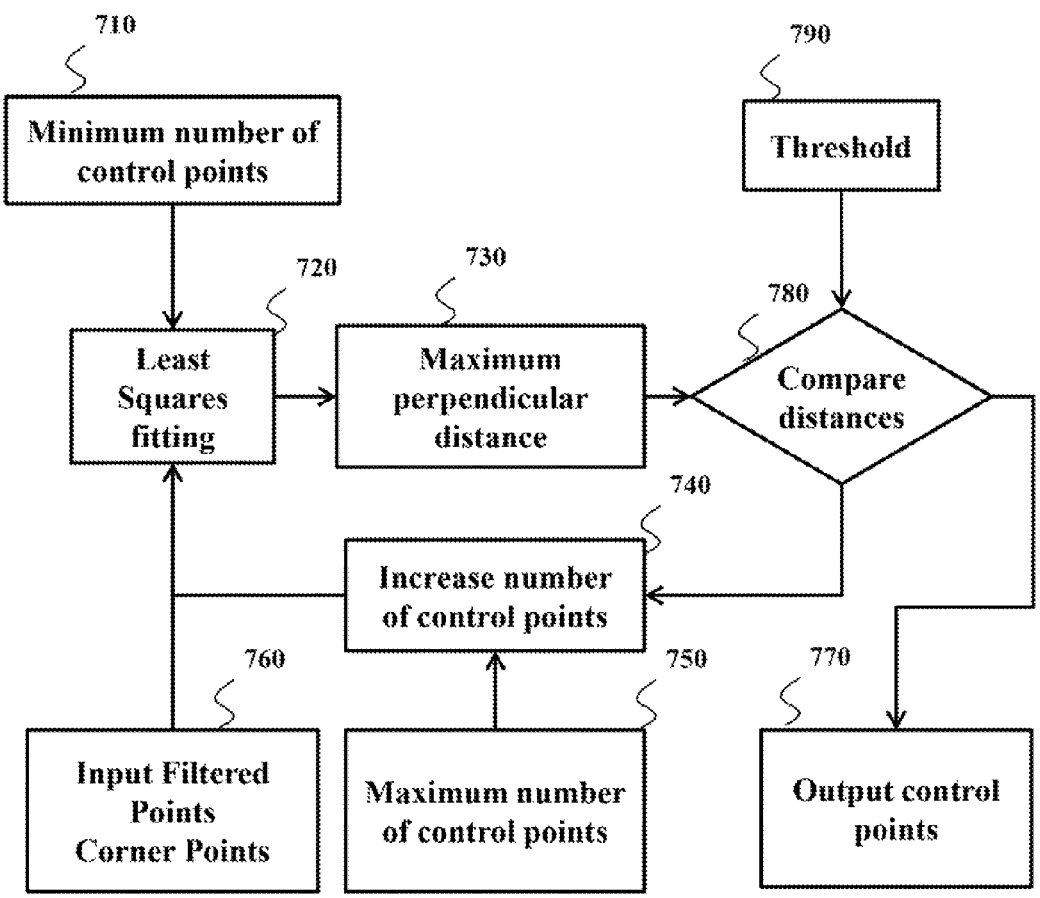
FIG. 7 is a block diagram of a method for fitting the spline according to another embodiment.

FIG. 7 shows a block diagram of a method for fitting the spline according to one embodiment. The spline fitting function takes the input filtered points and corner points 760 and fits smooth spline to these points. Starting from a minimum number of control points 710, fitting a spline involves estimating the values of control points which is done in a least squares framework 720.

After estimating the control points, the distance of each input point from the fitted spline 730 is computed and compared 780. If the maximum distance is less than a threshold 790, the current estimate of control points 770 is provided as an output. If not, the number of control points are increased 740 subject to a maximum number of control points 750. The iterative procedure ensures that the fitted spline remains within a band of input filtered points.

Figure 8A:
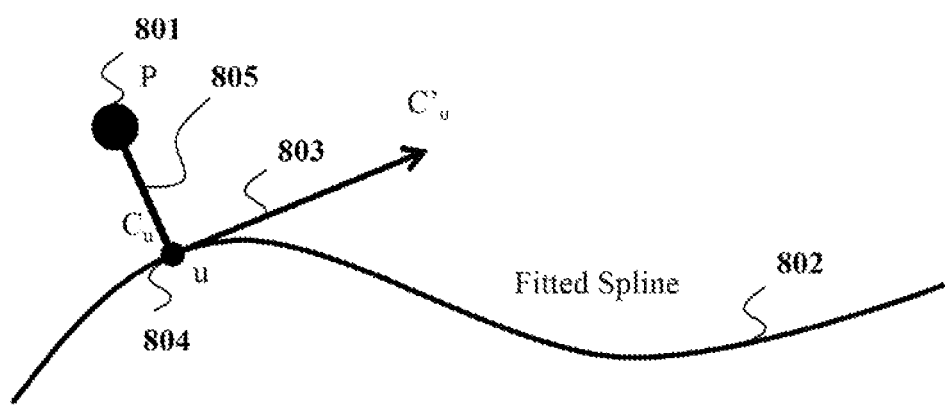
FIG. 8A is a schematic of a method for determining a distance used by some embodiments of the invention.

FIG. 8A shows a schematic of a method for determining a distance used by some embodiments of the invention. In those embodiments, the distance 805 of a given point P 801 from the fitted spline 802 is given by the distance between the point P 801 and the spline C(u) at a point u 804, where the point u 804 is the point where the local derivative of spline C'(u) 803 is perpendicular to the line joining P and C(u).

Figure 8B:
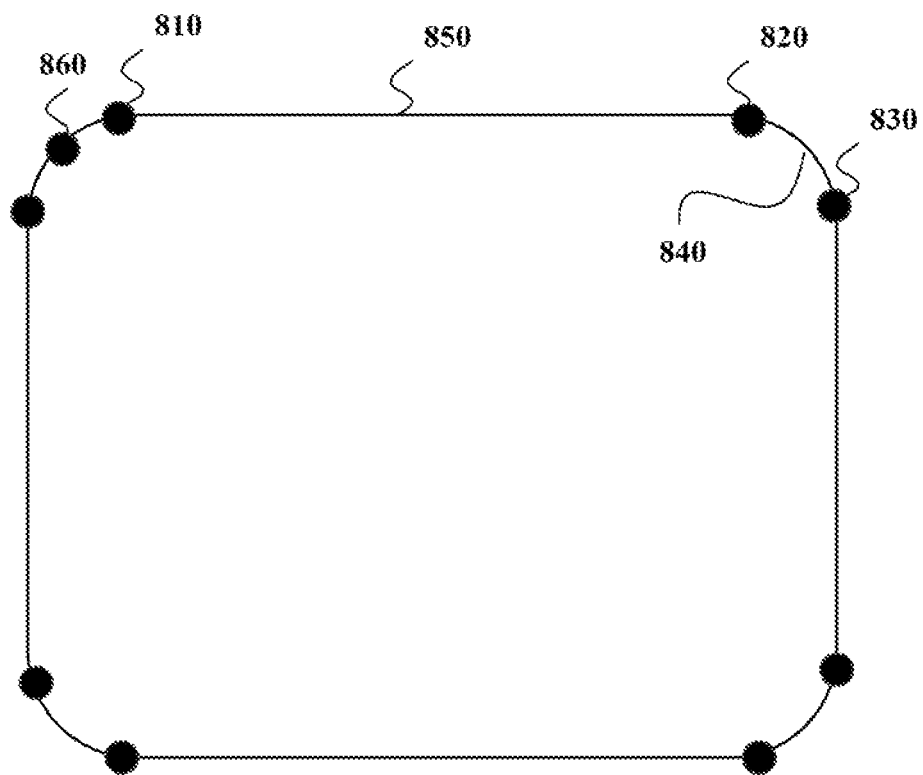
FIG. 8B is an example of the trajectory determined according to the principles of some embodiments.

FIG. 8B shows an example of the trajectory determined according to the principles of some embodiments. The trajectory includes corner points such as points 810, 820 and 830 connected by the splines, such as a spline 840, and straight lines, such as a line 850. The trajectory can also include a output points 860 determined by sampling the splines.

Figure 9:
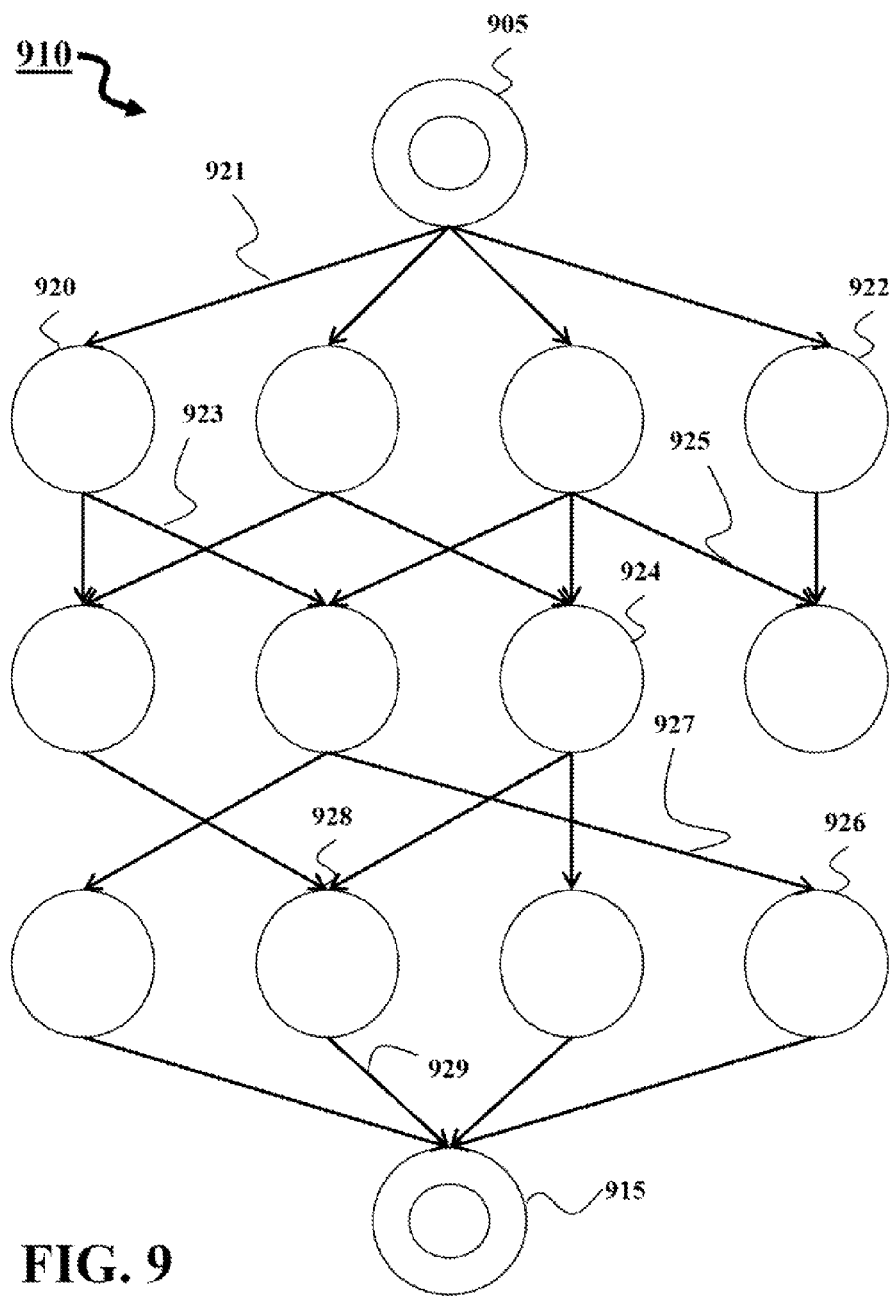
FIG. 9 is an example of determining the optimal sequence using dynamic programming (DP) according to one embodiment of the invention.

FIG. 9 shows an example of determining the optimal sequence using dynamic programming (DP) according to one embodiment of the invention. The number of possible sequences 315 increases exponentially with the length of input trajectory, and some embodiments use a scoring system that allows the top-scoring sequence to be identified via dynamic programming. The dynamic programming is an optimization method whose computational time increases only linearly with the sequence length and with the number of distinct label pairs that are allowed to occur in sequence.

Conceptually, one embodiment determines a graph 910 having a starting point 905 and an ending point 915. Each vertex of the graph, such as vertices 920, 922, 924, 926, and 928 represents a decision (e.g., an assignment of a label to an incoming data point) and every pair vertices that represent two compatible decisions are connected by an edge, e.g., an edge 921, 923, 925, 927, and 929. A cost is assigned to every vertex and every edge, and the optimal sequence is determined by finding the lowest cost path from the starting to the ending points.

For example, a vertex that represents a point labeled as a corner point can have a low cost if the line segments connecting the point to its predecessor and successor are strongly angled, and a high cost when the line segments are nearly colinear or they are extremely short (in which case the point might be an outlier). A vertex representing a labeling of a specific data point as a smooth point can have low cost if the line segments connecting the data point to predecessor and successor points in the graph has a very shallow angle. Successors in the graph need not be successors in the incoming data stream. For example, an edge can connect two vertices that represent two "smooth" data points that are not sequential in the data stream. This edge can have low cost if the intervening points in the data stream are very close to an imaginary line connecting the two "smooth" data points. If the lowest-cost path through the graph passes through this edge, the intervening points are labeled as "redundant.". Additional labels and pricing policies may be incorporated to exploit additional knowledge about the input trajectory.

Figure 10A:
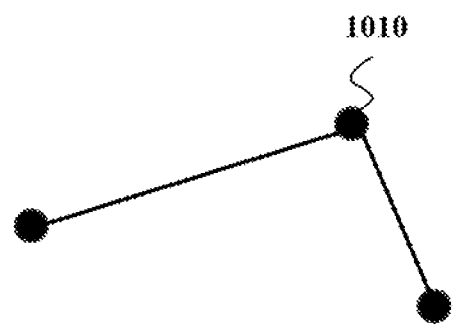
FIGS. 10A, 10B and 10C are segments illustrating labeling and cost assignments according to one embodiment of the invention.
Figure 10B:
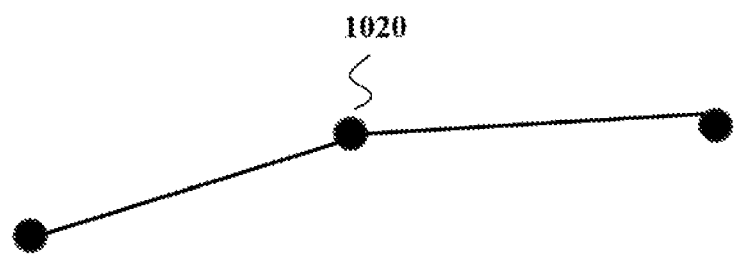
Figure 10C:
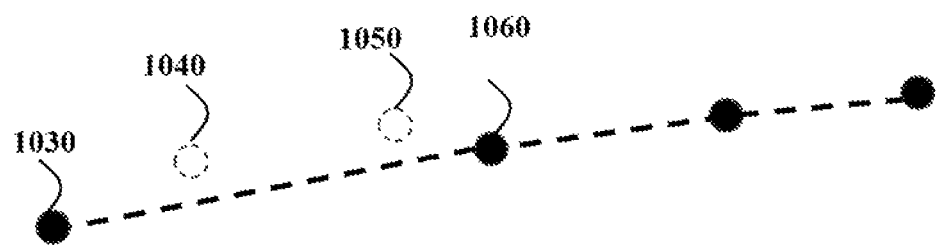

FIGS. 10A, 10B and 10C show segments illustrating labeling and cost assignments. For example, the cost of labeling a point 1010 at FIG. 10A as a corner point is lower than labeling the point 1010 as a smooth point. The cost of labeling a point 1020 in FIG. 10B as a smooth point is lower than labeling the point 1020 as a corner point. As shown in FIG. 10C, the cost of labeling a point 1030 and a point 1060 as smooth points is lower than the corner points cost because the dropped points 1040 and 1050 are closers to the line joining points 1030 and 1060.

In the embodiment of FIG. 9, the graph 910 has a highly regular structure that is known as a "trellis," with a repeated pattern of edges for each input point. The graph is evaluated by storing at every vertex the cumulative cost of the lowest-cost path to that vertex, plus a pointer to the prior vertex on that path. If the length of the longest subsequence of points that can be labeled "redundant" is limited, then the computation time to construct and evaluate the graph is constant per input point. To identify the optimal sequence up to some data point, some embodiments examine all the vertices representing labeling of that data point, select the vertex having the lowest cumulative cost, and then follow the pointers back through the graph as far as needed. The sequence of vertices on this path yields the optimal sequence of labels on the data points.

Aside from the computational advantages of this scheme, dynamic programming trellises have the property that contextual information can be propagated forward or backward in the sequence to resolve local ambiguities. For example, some trajectory-smoothing algorithms look at fixed windows of five sequential data points. In a windowed algorithm, a point that is somewhat off the line formed by the other four points might be smoothed, but in the larger context afforded by dynamic programming, the point might be more correctly labeled as a corner.

As additional data points come in, the graph can be incrementally extended and evaluated. Similarly, older sections of the graph can be pruned once the corresponding data points have been processed, especially when optimal subsequences pass through a single vertex (e.g., an unambiguous corner).

The dynamic programming can be implemented on a block by block basis, where the block size could depend on the amount of memory available in the controller. For each block, dynamic programming outputs the redundant points and various labels such as corners. The blocks could overlap at the block boundary to properly propagate information from previous block to the next block. For example, the overlap window could include last few points which are kept in the previous block.

Figure 11:
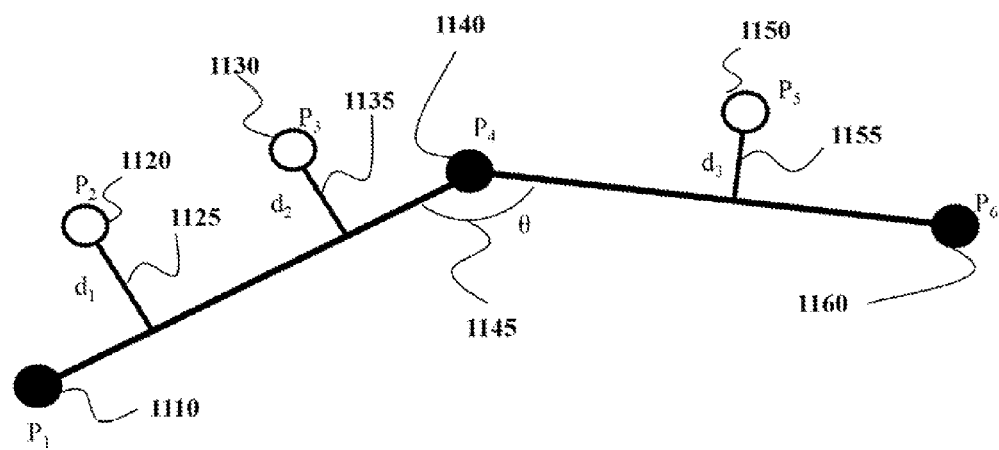
FIG. 11 is an example of analyzing a sequence of points according to one embodiment.

FIG. 11 shows an example of analyzing a sequence of points according to one embodiment. The length of the longest subsequence of points that can be labeled "redundant" can be limited to a small number WindowSize. In one embodiment, WindowSize is set to 8.

The sequence of points of FIG. 11 includes six input points. The points $P_1$ 1110, $P_4$ 1140 and $P_6$ 1160 are kept points, and the points $P_2$ 1120, $P_3$ 1130 and $P_5$ 1150 are removed. The local cost of removing point $P_2$ is $d_1$ 1125, which is the perpendicular distance of $P_2$ from the line joining the points $P_1$ and $P_4$. Similarly, the local cost of removing the point $P_3$ is $d_2$ 1135, which is the perpendicular distance of the point $P_2$ from the line joining the points $P_1$ and $P_4$, and the local cost of removing the point $P_5$ is the distance $d_3$ 1155.

First, assuming that the point $P_4$ is a smooth point, the angle cost at the kept point P4 can be defined based on angle θ 1145 as Angle Cost $AC(P1,P4,P6)=\mathrm{abs}(\pi-\theta)/\pi$, where θ is in radians.

The total cost of this sequence can be obtained by adding the local costs and is given by Total cost$=d1+d2+d3+\mathrm{abs}(\pi-\theta)/\pi$.

In addition, for this subsequence, we can also assume P4 to be a corner point instead of a smooth point. The local corner cost for angle θ can be defined as Corner Cost $CC(\theta)=k\theta$, where k is a constant.

The constant k can be selected so that the angle cost and corner cost becomes equal at a pre-defined angle. The total cost for this subsequence is $$d1+d2+d3+k\theta. \quad (5)$$

In addition, the six input points of the sequence of FIG. 11 can form several other sub-sequences. For example, another subsequence can be obtained by keeping the points $P_1$, $P_2$ and $P_6$ and removing the points $P_3$, $P_4$ and $P_5$. For all the possible subsequences, the total cost is determines and the subsequence which provides the smallest cost is selected as the optimal subsequence. While this selection has exponential complexity, the dynamic programming allows to compute the optimal solution in bounded time.

Operating Environment

Various embodiments of the invention can be operated by numerous general purpose or special purpose computing system environments or configurations. Examples of computing systems, environments, and/or configurations that are suitable for use with the invention include, but are not limited to, personal computers, server computers, handheld or laptop devices, multiprocessor or multi-core systems, graphics processing units (GPUs), application-specific integrated circuits (ASICs), field programmable gate arrays (FPGAs), microcontroller-based systems, network PCs, mainframe computers, distributed computing environments that include any of the above systems or devices, and the like, i.e., generally processors.

For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format. A monitor or other type of display device 160 is connected to any of the above systems to enable visualization 162 of the invention.

Further, a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for generating a trajectory based on an input trajectory formed by points representing spatial coordinates for a numerically controlled (NC) process, comprising:
    determining a plurality of sequences of the points, wherein each sequence is formed by removing a unique combination of points from the input trajectory;
    determining, for each sequence, local costs of each point in the input trajectory, wherein the local cost of a point for a sequence is based on a spatial arrangement of the point with respect to at least some of points in the sequence;
    determining, for each sequence, a sum of corresponding local costs of each point in the input trajectory;
    determining the trajectory based on an optimal sequence with an optimal value of the sum of the local costs, wherein the optimal value is a minimum or a maximum of the sums of the local costs;
    labeling points in a sequence as one or combination of preserved, corner, noise, or redundant points; and
    fitting splines into the points of the sequence using the labeling, and wherein steps of the method are performed by a processor.

2. The method of claim 1, wherein the local cost of the point removed from the sequence includes a distance cost proportional to a distance from the removed point to a chord connecting two points in the sequence surrounding the point, and the local cost of the point preserved in the sequence includes an angle cost proportional to an angle formed by the preserved point with the two points of the sequence surrounding the point.

3. The method of claim 1, wherein the local cost of the point includes one or combination of a distance cost, an angle cost, and a corner cost.

4. The method of claim 1, further comprising:
    determining corner points, intermediate points and points of straight segments in the optimal sequence; and
    fitting splines tracking the intermediate points between the corner points and the points of the straight segments;
    resampling the splines to produced output points, such that the corner points, the points of the straight segments and the output points define the trajectory.

5. The method of claim 2, further comprising:
    determining the preserved point in the optimal sequence as a corner point if the angle is below a threshold; and
    fitting splines between the corner points tracking at least some points in the optimal sequence.

6. The method of claim 5, further comprising:
    sampling the splines to produced output points, such that the corner points and the output points define the trajectory.

7. The method of claim 1, further comprising:
    determining a sum of the local costs for each sequence of the points using dynamic programming (DP).

8. The method of claim 7, further comprising:
    merging points within a distance below a threshold;
    constructing a DP trellis graph, wherein each vertex on the graph is a point associated with accumulated cost of traveling to the vertex, and wherein a pair of vertices is connected with an edge representing a cost of having the pair in the sequence;
    determining the optimal sequence corresponding to a path in the graph having a minimal cost.

9. A system for generating a trajectory based on an input trajectory formed by points representing spatial coordinates for a numerically controlled (NC) process, comprising a processor configured for:
    determining a plurality of sequences of the points, wherein each sequence is formed by removing a unique combination of points from the input trajectory, wherein the removing includes labeling the unique combination of points as removed points and labeling preserved points in the sequence as one or combination of preserved, corner, noise, or redundant points;

determining, for each sequence, local costs of each point in the input trajectory, wherein the local cost of a point for a sequence is based on a spatial arrangement of the point with respect to at least some of points in the sequence, and wherein the local cost of the point removed from the sequence includes a distance cost proportional to a distance from the removed point to a chord connecting two points in the sequence surrounding the point, and the local cost of the point preserved in the sequence includes an angle cost proportional to an angle formed by the preserved point with the two points of the sequence surrounding the point;

determining, for each sequence, a sum of corresponding local costs of each point in the input trajectory; and determining the trajectory based on an optimal sequence with an optimal value of the sum of the local costs; and fitting splines into the preserved points of the sequence using the labeling.

10. A method for generating a trajectory based on an input trajectory formed by points representing spatial coordinates for a numerically controlled (NC) process, comprising:

determining a plurality of sequences of the points, wherein each sequence is formed by removing a unique combination of points from the input trajectory;

determining, for each sequence, local costs of each point in the input trajectory, wherein the local cost of a point for a sequence is based on a spatial arrangement of the point with respect to at least some of points in the sequence;

determining, for each sequence, a sum of corresponding local costs of each point in the input trajectory;

determining the trajectory based on an optimal sequence with an optimal value of the sum of the local costs, wherein the optimal value is a minimum or a maximum of the sums of the local costs;

determining corner points, intermediate points and points of straight segments in the optimal sequence;

fitting splines tracking the intermediate points between the corner points and the points of the straight segments; and resampling the splines to produced output points, such that the corner points, the points of the straight segments and the output points define the trajectory, wherein steps of the method are performed by a processor.

11. A method for generating a trajectory based on an input trajectory formed by points representing spatial coordinates for a numerically controlled (NC) process, comprising:

determining a plurality of sequences of the points, wherein each sequence is formed by removing a unique combination of points from the input trajectory;

determining, for each sequence, local costs of each point in the input trajectory, wherein the local cost of a point for a sequence is based on a spatial arrangement of the point with respect to at least some of points in the sequence;

determining, for each sequence, a sum of corresponding local costs of each point in the input trajectory;

determining the trajectory based on an optimal sequence with an optimal value of the sum of the local costs, wherein the optimal value is a minimum or a maximum of the sums of the local costs;

determining a sum of the local costs for each sequence of the points using dynamic programming (DP);

merging points within a distance below a threshold;

constructing a DP trellis graph, wherein each vertex on the graph is a point associated with accumulated cost of traveling to the vertex, and wherein a pair of vertices is connected with an edge representing a cost of having the pair in the sequence; and determining the optimal sequence corresponding to a path in the graph having a minimal cost, wherein steps of the method are performed by a processor.

* * * * *